United States Patent
Peirce

(10) Patent No.: US 9,897,238 B2
(45) Date of Patent: Feb. 20, 2018

(54) TUBE COUPLING DEVICE

(71) Applicant: AGS I-Prop, LLC, Muskegon, MI (US)

(72) Inventor: John M. Peirce, Portage, MI (US)

(73) Assignee: AGS COMPANY AUTOMOTIVE SOLUTIONS LLC, Pittsburgh, PA (US)

( * ) Notice: Subject to any disclaimer, the term of this patent is extended or adjusted under 35 U.S.C. 154(b) by 752 days.

(21) Appl. No.: 14/470,250

(22) Filed: Aug. 27, 2014

(65) Prior Publication Data
US 2015/0061283 A1    Mar. 5, 2015

Related U.S. Application Data

(60) Provisional application No. 61/871,616, filed on Aug. 29, 2013.

(51) Int. Cl.
*F16L 19/04*  (2006.01)
*F16L 19/065* (2006.01)
*F16L 19/08*  (2006.01)

(52) U.S. Cl.
CPC ......... *F16L 19/041* (2013.01); *F16L 19/043* (2013.01); *F16L 19/0653* (2013.01); *F16L 19/086* (2013.01)

(58) Field of Classification Search
CPC ....... F16L 19/065; F16L 19/10; F16L 19/086; F16L 19/0653; F16L 19/043
See application file for complete search history.

(56) References Cited

U.S. PATENT DOCUMENTS

| 1,098,294 | A |   | 5/1914  | Patty |            |
|-----------|---|---|---------|-------|------------|
| 1,844,023 | A |   | 2/1932  | Terry |            |
| 1,934,022 | A |   | 11/1933 | Wiggins |          |
| 2,477,969 | A | * | 8/1949  | Donner | ............ F16L 19/065 |
|           |   |   |         |        | 277/607 |
| 2,554,585 | A | * | 5/1951  | Miller | ............ F16L 19/10 |
|           |   |   |         |        | 285/334.5 |

(Continued)

FOREIGN PATENT DOCUMENTS

WO    WO2013148752    10/2013

OTHER PUBLICATIONS

FlexWorks Barbed Fittings by OPW Fueling Containment Systems, Publication BFF-0001, dated Sep. 10, 2008.

*Primary Examiner* — David E Bochna
(74) *Attorney, Agent, or Firm* — Gardner, Linn, Burkhart & Flory, LLP

(57) ABSTRACT

A coupling device for coupling to a fluid line includes a coupler body having an end portion with a threaded outer surface and a conical inner surface. A fastener threadedly engages the threaded outer surface of the coupler body. A ferrule includes a rotational driving portion and a clamping portion having a threaded inner surface. When a tube is inserted through the ferrule and the fastener and into the end portion of the coupler body, the fastener threads onto the coupler body and the conical inner surface of the coupler body engages an outer surface of the clamping portion of the ferrule to substantially clamp the clamping portion of the ferrule around the tube. With the fastener tightened, the ferrule is rotatable relative to the fastener and the coupler body and the tube, whereby rotation of the ferrule moves the tube further into the coupler body.

24 Claims, 3 Drawing Sheets

(56) References Cited

U.S. PATENT DOCUMENTS

| | | | |
|---|---|---|---|
| 2,585,453 A * | 2/1952 | Gallagher | F16L 19/086 |
| | | | 285/341 |
| 2,693,377 A * | 11/1954 | Wurzburger | F16L 19/10 |
| | | | 188/14 |
| 3,169,786 A * | 2/1965 | Cator | F16L 19/10 |
| | | | 285/3 |
| 3,233,924 A * | 2/1966 | Stanley | F16L 19/10 |
| | | | 285/148.19 |
| 3,275,347 A * | 9/1966 | Scott | F16L 19/10 |
| | | | 285/139.3 |
| 3,275,350 A * | 9/1966 | Kody | F16L 19/065 |
| | | | 285/341 |
| 3,659,881 A * | 5/1972 | Tinsley | F16L 19/065 |
| | | | 285/249 |
| 3,843,169 A | 10/1974 | Wise | |
| 4,236,736 A | 12/1980 | Anderson | |
| 4,340,052 A | 7/1982 | Dennehey et al. | |
| 4,934,022 A | 6/1990 | Wiggins | |
| 4,934,745 A | 6/1990 | Healy | |
| 5,308,122 A * | 5/1994 | Crawford | F16L 19/065 |
| | | | 285/332.4 |
| 5,388,871 A | 2/1995 | Saitoh | |
| 5,452,748 A | 9/1995 | Simmons et al. | |
| 6,003,906 A | 12/1999 | Fogarty et al. | |
| 6,517,122 B1 | 2/2003 | Minemyer | |
| 6,846,124 B2 | 1/2005 | Warburton-Pitt | |
| 6,916,051 B2 | 7/2005 | Fisher | |
| 7,108,292 B2 | 9/2006 | Lipscomb et al. | |
| 7,648,178 B1 | 1/2010 | Andros | |
| 7,690,699 B2 | 4/2010 | Smahl | |
| 2008/0007048 A1 * | 1/2008 | Benoit | F16L 19/065 |
| | | | 285/247 |
| 2008/0272590 A1 | 11/2008 | Howard et al. | |
| 2013/0257041 A1 | 10/2013 | Peirce | |

* cited by examiner

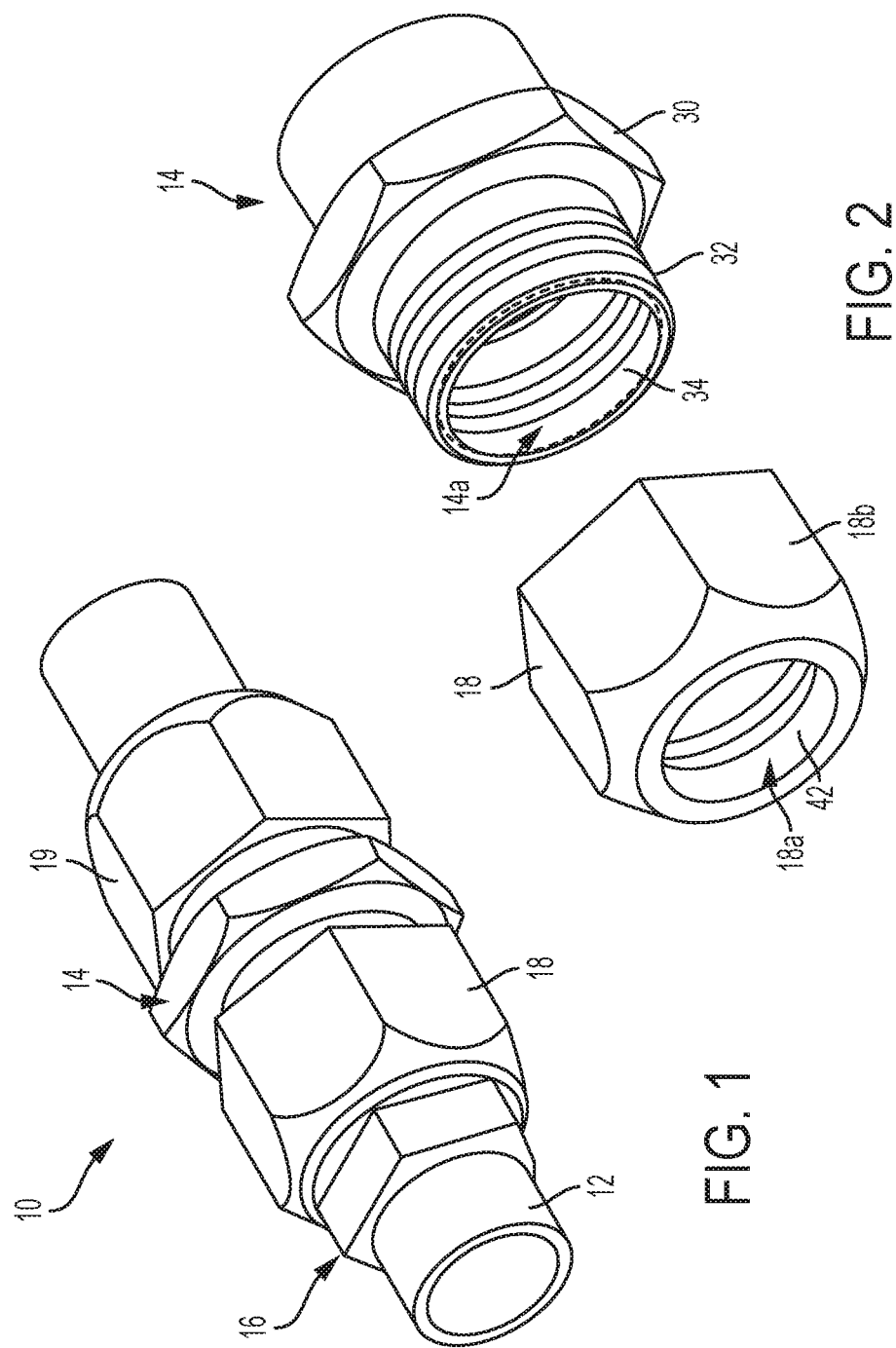

TUBE COUPLING DEVICE

CROSS REFERENCE TO RELATED APPLICATION

The present application claims priority of U.S. patent application Ser. No. 61/871,616, filed Aug. 29, 2013, which is hereby incorporated herein by reference in its entirety.

FIELD OF THE INVENTION

The present invention relates generally to couplers and fittings for joining or splicing fluid lines together.

BACKGROUND OF THE INVENTION

Fluid lines, conduits, hoses, pipes and the like are commonly used for conveying fluids from one portion of a vehicle to another. Such conduits may be associated with fuel, engine and transmission oils and other lubricants, power steering fluid, coolants or refrigerants, hydraulic brake fluids, shock absorber fluid, ride-height control fluid, and/or the like. When a fluid line cracks or leaks, the line needs to be replaced or a damaged part of the line may be removed and the opposed ends of two separate lines may be spliced together.

SUMMARY OF THE INVENTION

The present invention provides a coupler assembly for use in coupling a fluid line. The coupler of the present invention includes a fitting body and a ferrule that is pressed into the body to compress or clamp onto a tube or pipe inserted through the ferrule and into the body. The ferrule includes an inner threaded passageway and a non-circular fastener engaging portion, and the fitting body includes a ramped or conical tube engaging surface or wall that engages an end of the pipe or tube and enhances the sealing of the pipe or tube relative to the fitting. When a pipe or tube is inserted into the ferrule and the ferrule is pressed into the fitting body, such as via rotational driving of a fastener or nut at an end of the fitting body, the end of the pipe or tube engages the conical end wall. Rotational driving of the fastener engaging portion of the ferrule rotates the inner threaded passageway, which bites into the pipe or tube and functions to further longitudinally move the pipe or tube into engagement with the conical end wall, thereby further sealing the end of the pipe or tube at the fitting body.

According to an aspect of the present invention, a coupling device for coupling a fluid line or tube at a fitting body includes a coupler body, a fastener and a ferrule. The coupler body has an end portion configured for insertion of a tube therein, with the end portion comprising a threaded outer surface and a conical inner surface. The fastener is for threadedly engaging the threaded outer surface of the coupler body. The ferrule is configured for insertion of a tube therethrough, and the ferrule comprises a clamping portion and a rotational driving portion. The clamping portion has a threaded inner surface. When a tube is inserted through the ferrule and the fastener and into the end portion of the coupler body, the fastener is threaded onto the coupler body and the conical inner surface of the coupler body engages an outer surface of the clamping portion of the ferrule to substantially clamp the clamping portion of the ferrule around the tube. When the fastener is tightened onto the coupler body, the ferrule is rotatable via rotational driving of the rotational driving portion to rotate the ferrule relative to the fastener and the coupler body and the tube, whereby rotation of the threaded inner surface of the ferrule imparts a longitudinal movement of the tube to move the tube further into the coupler body.

Optionally, the rotational driving of the ferrule is in a direction opposite the rotational direction that tightens the fastener onto the coupler body. The coupler body comprises an end wall configured for engagement with an end of the tube when the fastener is tightened onto the coupler body, and the end of the tube is pressed further into engagement with the end wall via the rotational driving of the ferrule. The end wall may comprise a conical-shaped end wall, and when the ferrule is rotatably driven, an end region or edge of the conical-shaped end wall is received in the end of the tube and flares the end of the tube radially outwardly.

Therefore, the coupler or splicer of the present invention facilitates coupling a fluid line to a connector or coupler. The fluid line coupler provides enhanced assembly and joining of one or two pipe or tube ends at the coupler and substantially retains and seals the pipe or tube ends relative to the coupler. The coupler of the present invention provides enhanced sealing of the pipe or tube at the coupler and may be suitable for high pressure applications, where the pipe or tube is used as a conduit for fluid under higher pressure, such as fluid lines or hoses or pipes or tubes that carry pressurized fluid at pressures of up to or more than, for example, about 300 psi, or at least about 500 psi or more.

These and other objects, advantages, purposes and features of the present invention will become apparent upon review of the following specification in conjunction with the drawings.

BRIEF DESCRIPTION OF THE DRAWINGS

FIG. 1 is a perspective view of a coupler of the present invention;

FIG. 2 is an exploded perspective view of the fitting body and female fastener of the coupler of FIG. 1;

DESCRIPTION OF THE PREFERRED EMBODIMENTS

Figure 3:
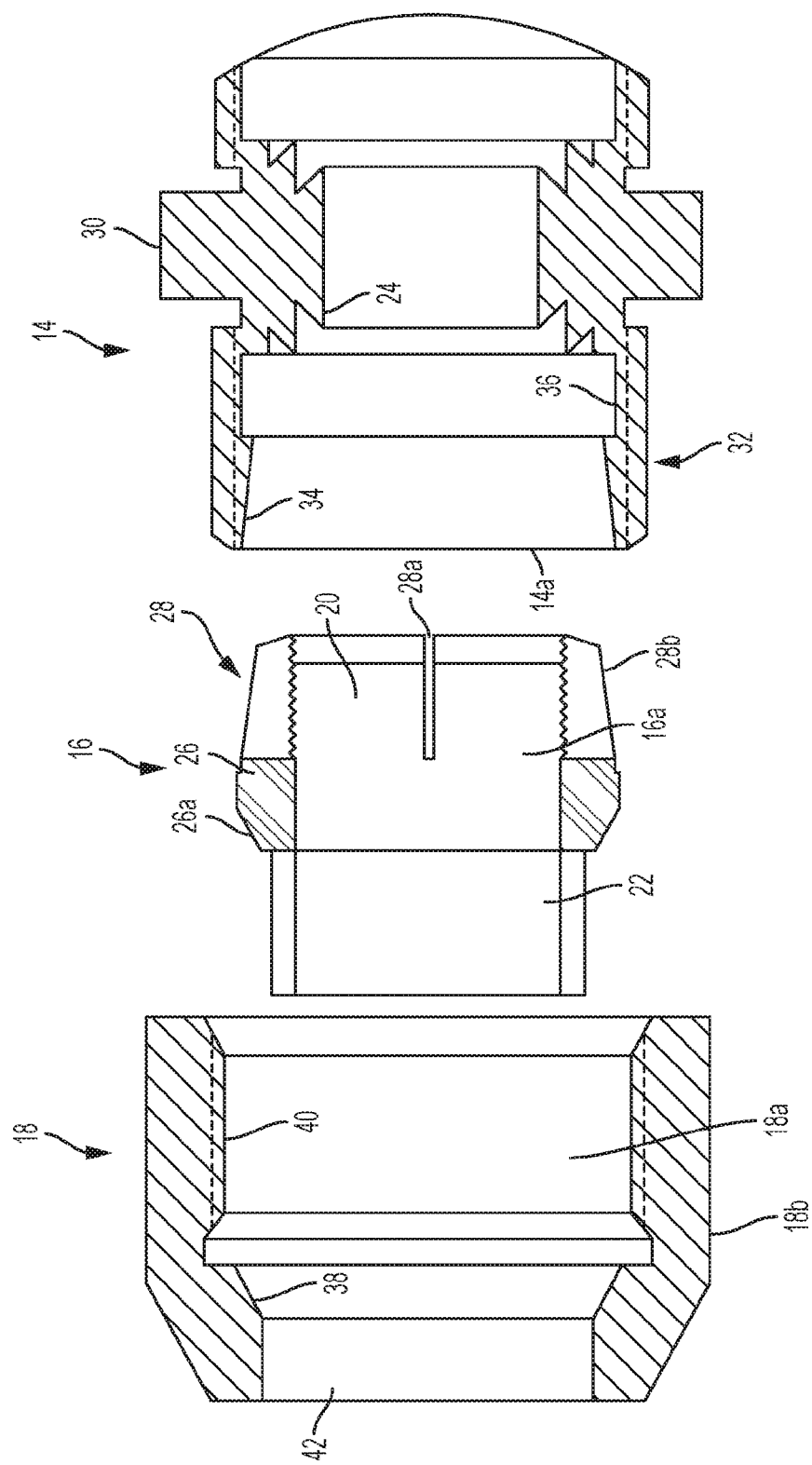
FIG. 3 is an exploded sectional view of the coupler of the present invention.

Referring now to the drawings and the illustrative embodiments depicted therein, a coupler or splicer or coupling assembly or device 10 for coupling to an end of a fluid conduit or pipe or tube 12 includes a coupler body or fitting body 14, a ferrule 16 and a female fastener 18 (FIGS. 1-4). The ferrule 16 has an internal threaded passageway portion 20 and a rotational driving portion 22, whereby rotation of the ferrule 16 when a pipe or tube 12 is received therein imparts a longitudinal movement of the pipe or tube towards and into engagement with an end wall or surface 24 of the fitting body 14, as discussed below. The end wall or surface 24 may comprise a ramped surface or conical surface that engages the end of the pipe or tube and further seals the fitting body relative to the pipe or tube, as also discussed below. Although shown in FIGS. 2-4 and described as connecting a hose or pipe or tube at one end of the fitting body, the coupler and fitting body may be configured to attach or couple to a hose or pipe or tube at both ends of the fitting body to couple or splice the conduits together (such as shown in FIG. 1), and the other end may be similar to the first end or may comprise any suitable coupling arrangement or configuration, such as by utilizing aspects of the couplers described in U.S. patent applications, Ser. No. 13/851,196, filed Mar. 27, 2013, and/or Ser. No. 14/447,658, filed Jul. 31, 2013, which are hereby incorporated herein by reference in their entireties. The coupler of the present invention thus provides enhanced connection of the pipe or tube and limits or substantially precludes retraction or disconnection of the pipe or tube from the coupler when the fastener 18 is tightened, as also discussed below. The coupler of the present invention is suitable for coupling any types of fluid lines together, and is suitable for coupling high pressure fluid lines together.

In the illustrated embodiment, ferrule 16 comprises a hollow ferrule with a cylindrical passageway 16a therethrough for receiving a tube therein. The ferrule 16 includes a base portion 26 having a ramped or conical surface 26a and having the rotational drive portion or fastener engaging portion 22 protruding from the base portion. The fastener engaging portion 22 has a non-circular shaped outer form or surface (such as a hexagonal-shaped form) that may be rotationally driven via a wrench or the like to rotate the ferrule separate from the female fastener 18.

The ferrule also includes a slotted tapered flexible or clamping portion 28 that protrudes or extends from the base portion 26 at an opposite end from the fastener engaging portion 22. The clamping portion 28 includes longitudinal slots 28a therealong so that the clamping portion 28 may flex radially inward as the ramped or tapered surface 28b of the clamping portion 28 of the ferrule 16 is moved into engagement with a correspondingly ramped inner surface 34 of the fitting body 14, as discussed below. The cylindrical passageway 16a of the ferrule includes a threaded portion 20, with the threads being disposed along the inner surface of the clamping portion 28. The threads 20a may be reverse threaded so that clockwise rotation of the ferrule via rotational driving of the rotational drive portion or fastener engaging portion 22 may impart a longitudinal movement of the tube towards and into engagement with the end wall 24 of the fitting body 14, as discussed below.

In the illustrated embodiment, fitting body 14 comprises a hollow body having a passageway 14a therethrough. The fitting body 14 includes a non-circular shaped (such as a hexagonal-shaped form) fastener engaging portion 30 and a threaded end portion 32 having threads along its outer cylindrical surface for threadedly engaging the fastener 18. The fitting body 14 further includes a tapered or ramped or conical inner surface portion 34 at its outer end for engaging the ramped surface 28b of the ferrule 16 as the ferrule is pressed into the fitting body 14 (via tightening of the fastener 18) so as to compress or flex or radially clamp the clamping portion 28 of the ferrule onto the pipe or tube disposed therein. The fitting body may comprise any suitable material, such as a polymeric material or metallic material, and may be a substantially rigid and non-flexible construction.

Figure 4:
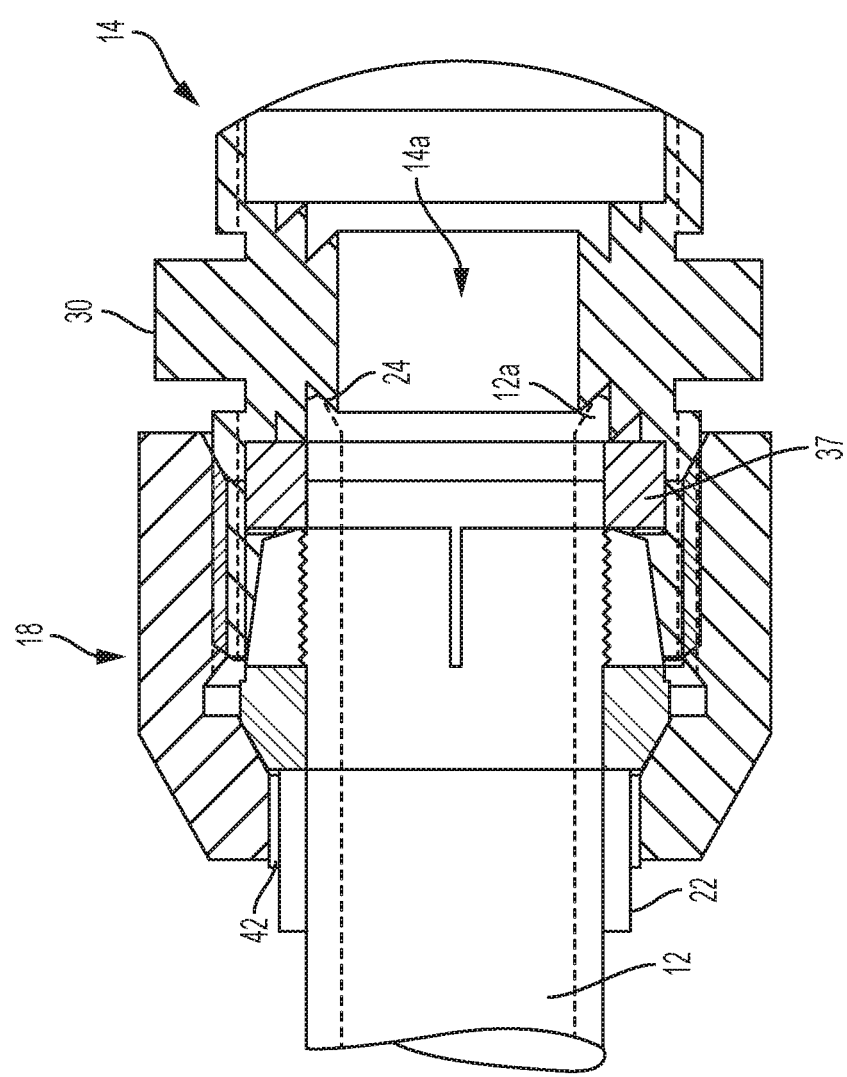
FIG. 4 is a sectional view of the coupler of FIG. 3, shown with a tube inserted into the coupler and the fastener tightened onto the fitting body to couple the tube at the coupler.

The end wall 24 of the fitting body 14 comprises a conical surface that engages the end of the tube 12 and, when the tube is urged further into the fitting body (such as via rotational driving of the ferrule as discussed below), the end of the tube is pressed or wedged or pinched into the narrowing conical surface to further seal the tube relative to the fitting body. As shown in FIGS. 3 and 4, the fitting 14 may comprise different diameter end walls for engaging the ends of different diameter pipes or tubes, such that the fitting body may be used for different applications, such as by using different sized pipes or tubes and different sized ferrules and the like.

In the illustrated embodiment, the fitting body 14 includes an annular recess 36 between its ramped surface 34 and the end wall 24 for receiving a sealing element or ring 37 (FIG. 4) therein. The sealing element 37 is sized so that its outer diameter engages the inner wall of the recess 36 and its inner diameter engages and seals against the outer wall of the tube when the tube is inserted through the ferrule and the into the fitting body and the fastener is tightened to the fitting body.

The fastener 18 comprises a threaded female fastener having a passageway 18a established therethrough, with a conical or ramped inner surface 38 and a threaded inner surface 40 (although only fastener 18 is shown in FIGS. 2-4, the other fastener 19 (FIG. 1) may be substantially similar in construction and function). The diameter of the inner threaded surface 40 generally coincides with the diameter of the threaded portion 32 of the fitting body 14. The ramped or conical inner surface 38 generally coincides with the angle or shape of the tapered or conical-shaped end 26a of the ferrule 16. A cylindrical passageway 42 at the outer end of the fastener is sized to receive the rotational driving portion 22 of the ferrule 16 therethrough when the coupler is assembled. An outer surface 18b of fastener 18 may provide a hexagonal shape or other shape suitable for engaging with a wrench or tool to assist in tightening the fastener onto the threaded portion of the fitting body 14.

Thus, when a pipe or tube 12 is inserted through the fastener 18 and through the ferrule 16 and into the end of the fitting body 14 (until the end 12a of the tube 12 is inserted through the sealing element and into engagement with the conical end wall 24), the fastener 18 may be tightened onto the fitting body 14 to press the ferrule into the ramped portion 34 of the fitting body and to clamp the clamping portion 28 of the ferrule onto the tube 12. When the fastener 18 is sufficiently tightened onto the fitting body 14, the clamping portion 28 is clamped onto the tube and the threads 20 at the inner surface of the clamping portion press into or bite into the outer surface of the tube 12.

As shown in FIG. 4, when the fastener is tightened onto the fitting body, the fastener engaging portion or rotational driving portion 22 of the ferrule 16 protrudes through the passageway 42 of the fastener 18, where a wrench may be used to rotate the ferrule to impart a longitudinal movement of the hose or tube via rotational movement of the threads 20 that are pressed into engagement with the outer surface of the tube. Optionally, and desirably, the threads 20 are reverse threads such that rotational driving of the driving portion 22 of the ferrule in the clockwise direction (the same direction of rotation that tightens the fastener 18 onto the fitting body 14) causes the threads 20 to move the tube in the direction towards the end wall 24 of the fitting body (due to the tight engagement or biting into of the threads at the tube so that limited or no slippage will occur between the tube and the threads when the ferrule is rotated and the tube is not rotated). Thus, the tube is moved into further engagement with the conical end wall by rotating the ferrule in a manner that will not loosen the fastener 18. As shown in FIG. 4, when the tube is moved into further engagement with the conical end wall, an end region or edge of the conical-shaped end wall is received in the end of the tube and the tube is flared outwardly and urged or forced into a wedge shaped recess to further seal the end of the tube relative to the fitting body. After the ferrule is rotated to fully seat the end of the tube at the end wall of the fitting body, the fastener 18 may be further tightened onto the fitting body to fully clamp the ferrule onto the tube.

Thus, the coupler of the present invention provides a high pressure connector for connecting a harder or less pliable or less flexible tube or hose (such as a metal tube or the like) at an end of a connector body. Optionally, the other end of the high pressure hose connector may be similar to the end described above or may couple with or connect to a different type of hose or tube, such as a softer or more pliable hose, and optionally the other end of the connector may utilize aspects of the connectors U.S. patent applications, Ser. No. 13/851,196, filed Mar. 27, 2013, and/or Ser. No. 14/447,658, filed Jul. 31, 2013, which are hereby incorporated herein by reference in their entireties.

When in use, the pipe or tube would go through the lockdown nut or fastener and through the ferrule. The end of the tube is pushed into the end of the center barrel or body making sure the tube is completely through the correct sized seal and the tube end is bottomed out snugly at the correct sized conical end wall. The lockdown nut is then threaded onto the body of the fitting snugly enough to engage the taper in the barrel which in turn engages the internal reverse threads of the ferrule into the face of the inserted tube. After the nut or fastener is sufficiently tightened, the ferrule may then be rotated in the same direction as the lockdown nut, and because of the reverse threads, such ferrule rotation will force or urge the tube deeper into the fitting body. Such movement of the tube will force the end of the tube over the steep angle tapered cone or conical end wall at the bottom of the corresponding sized step inside the barrel or fitting body. After the tube is forced down tightly, the lockdown nut is further tightened to put enhanced contact pressure on the ferrule, which in turn will force enhanced contact pressure on the tube both in the ferrule and also on the conical contact end of the tube.

Therefore, the present invention provides a fluid line coupler that provides enhanced assembly and joining of two tube ends and that substantially retains and seals the tube ends relative to one another. The fluid line coupler of the present invention provides a threaded ferrule that is rotated to impart a longitudinal movement of the tube so that the end of the tube is pressed tightly against an end wall of the fitting body. The end wall may comprise a conical end wall that pinches or clamps onto the end of the tube as the tube is moved into engagement with the end wall. The coupler of the present invention thus substantially seals and clamps and retains the tube within the coupler and may be adapted or configured for use in coupling high pressure fluid lines, such as fluid lines or hoses or tubes that carry pressurized fluid at pressures of up to or more than, for example, about 300 psi, or at least about 500 psi or more.

Changes and modifications to the specifically described embodiments may be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A coupling device for coupling to a fluid line, said coupling device comprising:
a coupler body having an end portion configured for insertion of a tube therein, said end portion comprising a threaded outer surface and an inner surface, and wherein said inner surface includes a conical inner surface portion;
a fastener for threadedly engaging said threaded outer surface of said coupler body;
a ferrule configured for insertion of a tube therethrough, said ferrule comprising a clamping portion and a rotational driving portion, wherein said clamping portion has a threaded inner surface;
wherein, when a tube is inserted through said ferrule and said fastener and into said end portion of said coupler body, said fastener is threaded onto said coupler body and said conical inner surface portion of said coupler body engages an outer surface of said clamping portion of said ferrule to substantially clamp said clamping portion of said ferrule around the tube; and
wherein, with said fastener tightened onto said coupler body, said ferrule is rotatable via rotational driving of said rotational driving portion to rotate said ferrule relative to said fastener and said coupler body and the tube, whereby rotation of said threaded inner surface of said ferrule imparts a longitudinal movement of the tube to move the tube further into said coupler body.

2. The coupling device of claim 1, wherein said rotational driving of said ferrule is in a direction opposite the rotational direction that tightens said fastener onto said coupler body.

3. The coupling device of claim 1, wherein, with said fastener tightened onto said coupler body, said rotational driving portion of said ferrule protrudes from said fastener.

4. The coupling device of claim 1, wherein said coupler body comprises an end wall configured for engagement with an end of the tube when said fastener is tightened onto said coupler body, and wherein the end of the tube is pressed further into engagement with said end wall via said rotational driving of said ferrule.

5. The coupling device of claim 4, wherein said end wall comprises a conical-shaped end wall, and wherein, when said ferrule is rotatably driven, an end region of said conical-shaped end wall is received in the end of the tube and as the tube is urged into further engagement with said end wall, said end region flares the end of the tube radially outwardly.

6. The coupling device of claim 5, wherein said coupler body comprises at least two conical-shaped end walls and said coupler body is configured to receive tubes having different diameters.

7. The coupling device of claim 6, wherein a ferrule is selected from multiple sized ferrules having different internal diameters for the particular sized tube that is being connected at said coupler body.

8. The coupling device of claim 1, wherein said coupler body comprises an annular recess established at said inner surface of said coupler body, and wherein a sealing element is disposed partially in said annular recess and configured to seal against an outer surface of the tube that is inserted through said ferrule and into said coupler body.

9. The coupling device of claim 8, wherein said annular recess is disposed at an inboard region of said conical inner surface portion of said coupler body.

10. The coupling device of claim 9, wherein, when said ferrule is fully received in said coupler body, an inboard end of said ferrule is at or near said sealing element.

11. The coupling device of claim 1, wherein an opposite end portion of said coupler body comprises a threaded outer surface and a conical inner surface and is configured for use with another said ferrule and said fastener.

12. The coupling device of claim 1, wherein an opposite end portion of said coupler body is configured to couple with another tube and is configured differently than said end portion.

13. A coupling device for coupling to a fluid line, said coupling device comprising:
- a coupler body having an end portion configured for insertion of a tube therein, said end portion comprising a threaded outer surface and an inner surface, and wherein said inner surface includes a conical inner surface portion;
- a fastener for threadedly engaging said threaded outer surface of said coupler body;
- a ferrule configured for insertion of a tube therethrough, said ferrule comprising a clamping portion and a rotational driving portion, wherein said clamping portion has a threaded inner surface;
- wherein, when a tube is inserted through said ferrule and said fastener and into said end portion of said coupler body, said fastener is threaded onto said coupler body and said conical inner surface portion of said coupler body engages an outer surface of said clamping portion of said ferrule to substantially clamp said clamping portion of said ferrule around the tube;
- wherein, with said fastener tightened onto said coupler body, said rotational driving portion of said ferrule protrudes from said fastener, and wherein said ferrule is rotatable via rotational driving of said rotational driving portion to rotate said ferrule relative to said fastener and said coupler body and the tube, whereby rotation of said threaded inner surface of said ferrule imparts a longitudinal movement of the tube to move the tube further into said coupler body; and
- wherein a sealing element is disposed in said coupler body and seals between said inner surface of said conical body and an outer surface of the tube that is inserted through said ferrule and into said coupler body.

14. The coupling device of claim 13, wherein said rotational driving of said ferrule is in a direction opposite the rotational direction that tightens said fastener onto said coupler body.

15. The coupling device of claim 13, wherein said coupler body comprises an end wall configured for engagement with an end of the tube when said fastener is tightened onto said coupler body, and wherein the end of the tube is pressed further into engagement with said end wall via said rotational driving of said ferrule.

16. The coupling device of claim 15, wherein said end wall comprises a conical-shaped end wall, and wherein, when said ferrule is rotatably driven, an end region of said conical-shaped end wall is received in the end of the tube and as the tube is urged into further engagement with said end wall, said end region flares the end of the tube radially outwardly.

17. The coupling device of claim 16, wherein said coupler body comprises at least two conical-shaped end walls and said coupler body is configured to receive tubes having different diameters, and wherein a ferrule is selected from multiple sized ferrules having different internal diameters for the particular sized tube that is being connected at said coupler body.

18. The coupling device of claim 13, wherein, when said ferrule is fully received in said coupler body, an inboard end of said ferrule is at or near said sealing element, and wherein said coupler body comprises an annular recess established at said inner surface of said coupler body, and wherein said sealing element is at least partially received in said annular recess.

19. A method of coupling a tube with a coupler, said method comprising:
- providing a coupler body having an end portion having a threaded outer surface and an inner surface, and wherein said inner surface includes a conical inner surface portion;
- providing a fastener that threadedly engages said threaded outer surface of said coupler body;
- providing a ferrule having a clamping portion and a rotational driving portion, wherein said clamping portion has a threaded inner surface;
- inserting a tube through said ferrule and said fastener and into said end portion of said coupler body;
- threading said fastener onto said threaded outer surface of said coupler body to move said clamping portion of said ferrule along said conical inner surface portion of said coupler body, whereby said conical inner surface portion of said coupler body engages an outer surface of said clamping portion of said ferrule to substantially clamp said clamping portion of said ferrule around the tube; and
- with said fastener tightened onto said coupler body, rotating said rotational driving portion of said ferrule to rotate said ferrule relative to said fastener and said coupler body and the tube, whereby rotation of said threaded inner surface of said ferrule longitudinally moves the tube further into said coupler body.

20. The method of claim 19, wherein, with said fastener tightened onto said coupler body, said rotational driving portion of said ferrule protrudes from said fastener.

21. The method of claim 19, comprising providing a sealing element in said coupler body to seal between said inner surface of said conical body and an outer surface of the tube that is inserted through said ferrule and into said coupler body.

22. The method of claim 19, wherein rotating said rotational driving portion of said ferrule comprises rotating said rotational driving portion in a direction opposite the rotational direction that tightens said fastener onto said coupler body.

23. The method of claim 19, wherein said end wall comprises a conical-shaped end wall, and wherein, when said ferrule is rotatably driven, an end region of said conical-shaped end wall is received in the end of the tube and as the tube is urged into further engagement with said end wall, said end region flares the end of the tube radially outwardly.

24. The method of claim 19, wherein said coupler body comprises at least two conical-shaped end walls and said coupler body is configured to receive tubes having different diameters, and wherein said method comprises selecting said ferrule from multiple sized ferrules having different internal diameters for the particular sized tube that is being connected at said coupler body.

* * * * *